April 19, 1927.

R. S. KIRKPATRICK

CASTER CENTERING AND RETAINING DEVICE

Filed Oct. 6, 1922

1,625,213

INVENTOR
R. S. KIRKPATRICK
BY Carl M. Sinclair
ATTORNEY

Patented Apr. 19, 1927.

1,625,213

UNITED STATES PATENT OFFICE.

ROBERT S. KIRKPATRICK, OF DES MOINES, IOWA, ASSIGNOR TO J. B. LADD, OF DES MOINES, IOWA.

CASTER CENTERING AND RETAINING DEVICE.

Application filed October 6, 1922. Serial No. 592,680.

The object of this invention is to provide improved means for centering and retaining a caster stem in and relative to a hollow portion of an object to be supported, such as the tubular leg of an article of furniture.

A further object of this invention is to provide an improved device adapted to be used in conjunction with a stem caster and having the function of providing a single point bearing for swiveling of the caster stem and also retaining the caster stem in a hollow portion of a load object.

A further object of this invention is to provide an adjustable spring yoke adapted to provide a single point swivel bearing for the caster stem and for retaining and centering the caster relative to a load object.

A further object of this invention is to provide a caster centering and retaining device which is exceedingly simple in construction and economical to manufacture, and at the same time easily installed by an unskilled person.

My invention consists in the construction, arrangement and combination of elements hereinafter set forth, pointed out in my claims and illustrated by the accompanying drawing, in which—

Figure 1 is a side elevation, partly in section, of my improved device in position for practical use, a portion of a load object being shown in section. Figure 2 is a view similar to and at right angles to Figure 1. Figure 3 is a cross-section on the line 3—3 of Figure 1.

Figure 1:
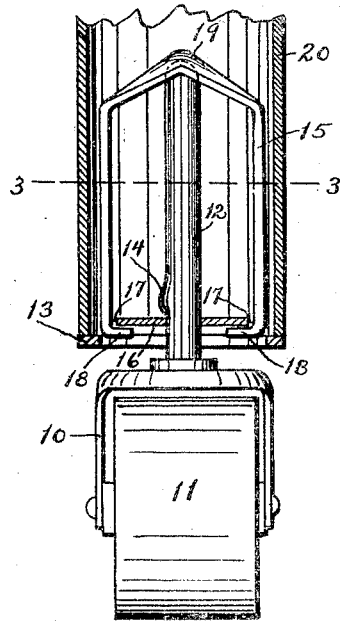
Figure 3:
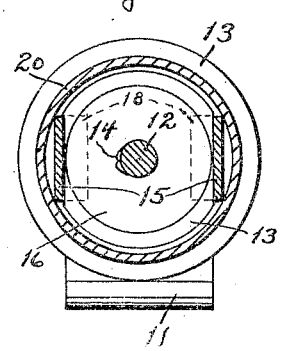
Figure 2:
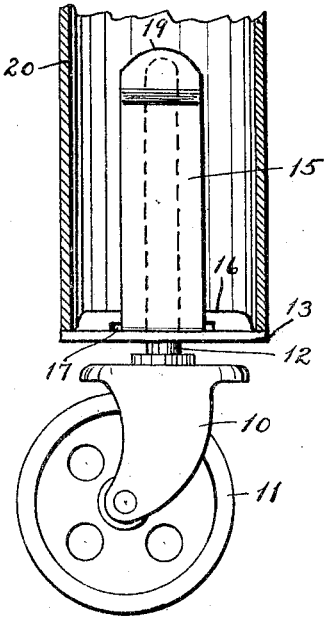

In the construction and application of the device as shown a caster is shown having a wheel yoke 10, a wheel 11 journaled therein, and a stem 12 fixed to and rising from said wheel yoke, which stem is circular in cross-section. A bearing and centering disk 13 is provided, which is formed with a central circular aperture by means of which it is rotatably mounted on the lower portion of the stem 12, and said stem is held against downward movement relative to said disk by means of a buhr, punched or upset portion 14 formed in said stem immediately above said disk, or by any other suitable means. A spring yoke 15 or arch is provided, of inverted U-shape, and is adapted to embrace the stem 12. The bearing disk 13 is formed with a central raised boss 16 of relatively large diameter, diametrically opposite portions of said boss being formed with horizontal slots 17 which receive inturned end portions or flanges 18 formed on the lower ends of the arms of the spring yoke 15. The closed upper end of the spring yoke 15 is formed with a cupped step bearing 19 to receive the upper end of the stem 12 of the caster and form a single point bearing therefor, said upper end preferably being of ball-form or semi-spherical, whereby the load object is supported on and axially of the stem of the caster. The outer annular portion of the lower bearing disk 13 is adapted to be engaged by a load object such as a leg 20 of a bed or other article of furniture, the weight being transferred through said disk and the spring arch 15 to the caster stem. As the caster stem receives this load on its upper end through the step bearing 19, it follows that the swiveling of the caster is rendered easy and sure and friction is avoided. The base disk 13 provides a bearing for the lower end of the stem 12, preventing tipping under strain, and the entire device is held in rigid relation to the load object by means of the spring yoke 15, the arms of which frictionally and firmly engage the walls of the tubular leg 20, or the walls of any socketed member to which the caster is applied.

The lower bearing disk 13 is held in place relative to the spring yoke 15 and stem 12 by means of the inturned flanges 18 engaging the slots 17.

The spring yoke 15 may be adjusted to sockets or tubular load objects of varying sizes, by manually adjusting the positions of the arms of the yoke relative to each other, by bending them toward or away from each other to the desired extent; and when so adjusted they firmly grip or frictionally engage the walls of the leg 20 or other similar member, prevent tipping of the caster and also withdrawal of the device. The flanges 18 of the spring yoke move freely in the slots 17 to permit compression of the yoke when inserted in the load object.

The members of the centering and retaining device lend themeslves to economy of manufacture through pressing and stamping, and the process of assembly is rapid and inexpensive.

The arms of the spring arch engage the walls of the leg 20 or other member throughout a material distance and thus provide stability and insure against tipping of the caster; and when the load is on the lower disk 13 the step bearing 19 automatically adjusts itself to the upper end of the stem.

Figure 4:
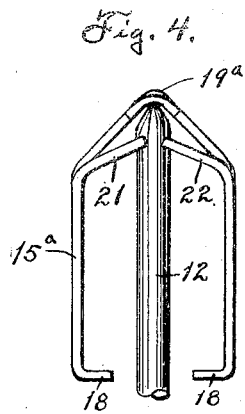
Figures 4 and 5 are fragmentary side views, at right angles to each other, showing a modified form of spring yoke which may be employed.
Figure 5:
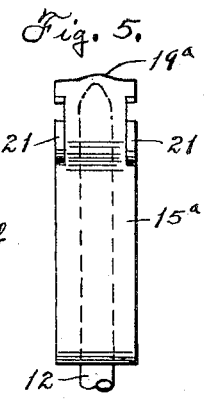

In the construction according to Figures 4 and 5 the upper end of the spring arch 15$^a$ is not cupped so decisively but is merely bent to V-shape to form a bearing 19$^a$. Tongues 21, 22 are formed on each side of the spring yoke by cutting and bending the metal at the upper ends of its arms, said tongues preventing or limiting lateral movement of the upper end of the stem 12 in either direction in the plane of the bending of the V-shaped closed upper end of the yoke.

Figure 6:
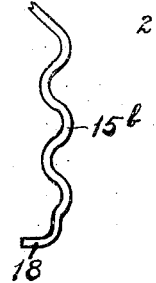
Figure 6 is a fragmentary view of a further modified form.

In the construction according to Figure 6 a spring yoke 15$^b$ is employed which has its arms transversely corrugated. This construction is of advantage where the caster is to be used with a load object made of wood, in which the socket opening has become or is apt to be worn or unduly enlarged, and it has a greater tendency to prevent withdrawal of the retaining device from such opening.

I claim as my invention—

1. The combination with a caster having a stem, of a centering and retaining device comprising a bearing disk pivotally mounted on said stem, and a spring yoke carried by said disk in embracing relation to said stem and having a step bearing at its closed end for the end of said stem, said yoke having frictional engagement with a load object, said yoke being slit and bent to form tongues at the upper ends of its arms on opposite sides of and adapted to prevent lateral displacement of said stem relative to said yoke.

2. The combination with a load object having a socket opening and a caster having a stem of less diameter than said opening, of a centering and retaining device comprising a bearing disk pivotally mounted on said stem and adapted to engage the lower end of said load object, said disk being formed with a central boss adapted to project upwardly within the socket opening, and a one-piece spring yoke carried by said disk in embracing relation to said stem and having a cupped step bearing on the upper end thereof, said boss being formed with diametrically opposed slots in its peripheral wall, said yoke having inturned flanges at its lower ends adapted to enter said slots, whereby said yoke may yield laterally for frictional engagement with the walls of said socket, the inturned flanges of said yoke being radially movable in a plane between the body and boss of said disk.

3. A caster for tubular legs including the permanent combination of a leg supporting plate having a central aperture, a pintle extending through and slidably supported in said aperture and limited in one direction of said sliding movement by engagement with the plate, and spring frame means permanently connected to the plate and comprising a substantially inverted U-shaped spring having its ends anchored to said plate adjacent the engagement thereof with the tubular leg and diametrically positioned with respect to each other and the pintle for forming a relatively clear chamber of substantially the area of the tubular leg into which said pintle extends, the mid-portion of said spring frame being formed to provide a top bearing for the end of said pintle and limiting sliding movement of said pintle with respect to said plate in the opposite direction and for simultaneously laterally confining said pintle in said clear chamber.

4. A caster for tubular legs including the permanent combination of a leg supporting plate having a central aperture, a pintle extending through and slidably supported in said aperture and limited in one direction of said sliding movement by engagement with the plate, and spring frame means permanently connected to the plate and comprising a substantially inverted U-shaped spring having its ends anchored to said plate adjacent the engagement thereof with the tubular leg and diametrically positioned with respect to each other and the pintle for forming a relatively clear chamber of substantially the area of the tubular leg into which said pintle extends, the mid-portion of said spring frame extending laterally of the pintle substantially into simultaneous engagement with the interior of the tubular leg and formed to provide a top bearing for the end of the said pintle and limiting sliding movement of said pintle with respect to said plate in the opposite direction and for simultaneously laterally confining said pintle in said clear chamber.

5. A caster for tubular legs including the permanent combination of a leg supporting plate having a central aperture, a pintle extending through and slidably supported in said aperture and limited in one direction of said sliding movement by engagement with the plate, and spring frame means permanently connected to the plate and comprising a substantially inverted U-shaped spring having its ends anchored to said plate against movement in one direction adjacent the engagement thereof with the tubular leg and diametrically positioned with respect to each other and the pintle for forming a relatively clear chamber of substantially the area of the tubular leg into which said pintle extends, the middle portion of said spring frame means being formed to provide a top bearing for the end of said pintle and limiting sliding movement of said pintle with respect to said plate in the opposite direction and for simultaneously laterally confining said pintle in said clear chamber.

Signed at Des Moines, in the county of Polk and State of Iowa, this 23d day of September, 1922.

ROBERT S. KIRKPATRICK.